R. C. SCHEMMEL

Dec. 22, 1931. FINISHING WELT Re. 18,297

Original Filed April 16, 1927

Inventor

Robert C. Schemmel,

By Wm. E. Dyre.

his Attorney

Witness

Edwin L. Bradford

Reissued Dec. 22, 1931

Re. 18,297

UNITED STATES PATENT OFFICE

ROBERT C. SCHEMMEL, OF UNION CITY, INDIANA

FINISHING WELT

Original No. 1,655,164, dated January 3, 1928, Serial No. 184,400, filed April 16, 1927. Application for reissue filed August 12, 1929. Serial No. 385,315.

My present invention relates to finishing welts of the type employed in trimming automobile bodies, interiors and tops, and for other uses, and more particularly to an improvement in the construction of such welts for the purpose of adapting the same to be easily and conveniently disposed about curves of relatively short radius without puckering or buckling of the inner edge of the welt.

The improved structure, generally stated, comprises a body portion made principally of any suitable filler material, such, for example, as twisted paper cord or the like, enclosed in a casing of resilient fabric or equivalent universally flexible material, such as leather, imitation leather or the like, and having included in the body portion a pliable element, or a plurality thereof, for the purpose of enabling the composite welt to be disposed about relatively sharp curves and to be retained in its curved form with an absolute minimum of puckering or buckling of the enclosing fabric about the inner or shorter edge of the curve.

In one form of embodiment, my present invention comprises an improvement in the type of finishing welt described by United States Letters Patent No. 1,226,600, issued to me under date of May 15, 1917, which is the type of welt illustrated in the accompanying drawings and described particularly herein. It is to be understood, however, that my present invention in its broader aspects comprises the combination of a pliable element with the customary parts of any well known welt structure, and is therefore by no means to be limited to incorporation of the pliable element in welts of the type known to the trade as "Hidem" welt, as disclosed and covered in my above identified prior patent and, merely by way of exemplification of the present invention, illustrated in the accompanying drawings.

With the foregoing and other objects in view, the present invention will now be particularly described and hereinafter pointed out by the appended claims.

In the accompanying drawings which form part of this application for Letters Patent and whereon like characters indicate corresponding parts in the several figures.

Figure 1:
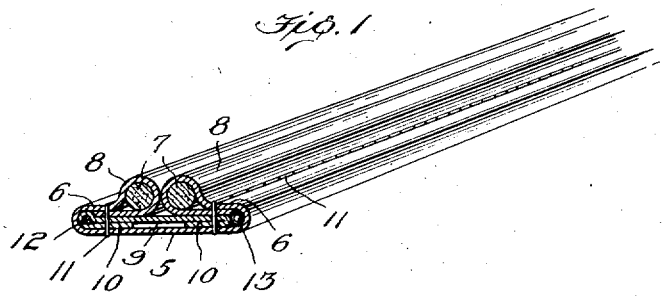
Figure 1 is a fragmentary view in perspective of the improved welt showing a transverse section thereof at one end.

Reference being had to the drawings and numerals thereon, 5 indicates the welt base or body, oppositely doubled upon itself as at 6, 6, and terminating, in the particular form of welt illustrated in the drawings, in loops which in turn enclose continuous cords, usually of tightly twisted paper or other suitable material 7, 7, to form the adjacent contacting and independent surface beads 8, 8, as shown.

Interposed between the base 5 and the enclosed beads, is a continuous running strip of flexible material, such as 9, affording additional body material to the completed structure. This filler strip may be of any suitable material, as also of various forms and arrangements, but the particular form shown has in practice proven itself eminently satisfactory, and consists of the flat continuous strip of gimp 9, folded upon itself as shown at 10, 10, and secured permanently in place by lines of stitches 11, 11, running from end to end of the welt upon both sides thereof adjacent to the said beads 8, 8, as shown.

Within one of the laterally extending side flanges of the welt, outside of the longitudinal stitches 11, as shown by the drawings, there is provided a metallic lining 12 or other bendable element as aforesaid of relatively stiff but pliable material, preferably enclosed by and contained within that edge of the filler strip 9 before the latter is introduced into the structure.

Figure 2:
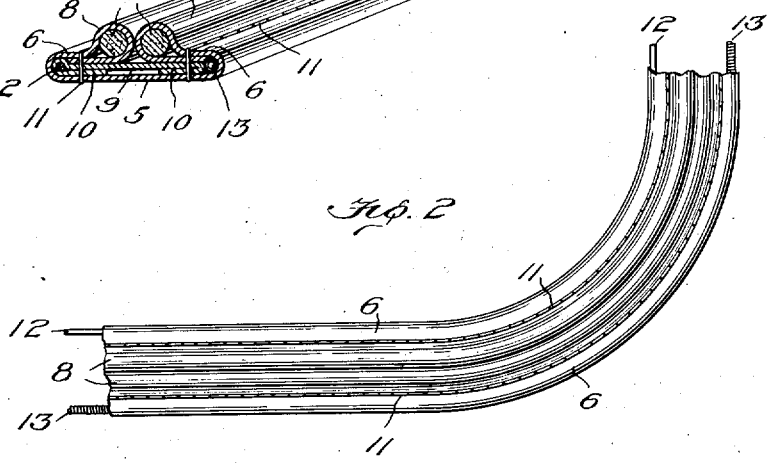
Fig. 2 is also a fragmentary view in plan, however, showing the parts illustrated by Figure 1.

In a corresponding location at the opposite edge of the welt structure there is provided a second metallic lining 13, which could also be of like material as that shown at 12, but preferably is formed of a small coil of wire, as best shown by Figs. 1, 2, and the modified Fig. 3, these linings or inserts 12 and 13 being for purposes that will later appear.

Figure 3:
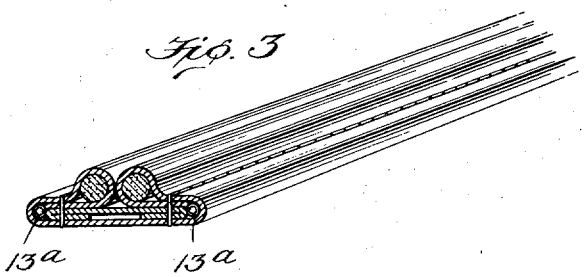
Figs. 3 and 4 are also fragmentary views in perspective showing modifications of this invention.
Figure 4:
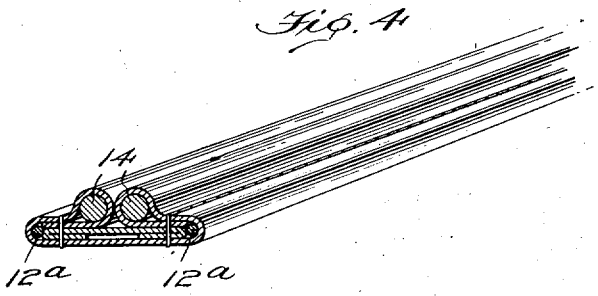

Figs. 3 and 4 represent modified forms of the present invention, in the former of which coils of wire 13*a*, 13*a* are employed, and in the latter of which two straight wires 12*a*, 12*a*, as shown, are employed, and also wire substitutes 14, 14, for the filler cords 7, 7.

The foregoing being a description of my invention, its use and operation, briefly stated, are as follows:

In applying this welt to the body, top or other part of an automobile or other support, the beads 8, 8 are forcibly spread apart to admit tacks (not shown) or other fastening means, after which said beads, under influence of their respective lines of stitches 11, 11, automatically close over the heads of the tacks or other fastening means to neatly and effectually conceal the same.

It is to be observed that the particular functions of the metallic lining or other bendable material 12, 13, 12*a* or 13*a* come into play when in the course of trimming the composite welt is disposed about curves or curved surfaces, as indicated by Fig. 2. In practice, when such curves are relatively sharp, trimmers have heretofore experienced considerable difficulty in preventing the welt from buckling, both horizontally and vertically. By use of the enclosed metallic edge lining or other bendable material aforesaid, I have discovered that the tendency to buckling of the welt is entirely overcome, the result being perfectly smooth inner and outer surfaces and edges, as shown by Fig. 2 of the drawings. By arranging the stretchable coiled lining on the exterior curved side of greater radius, this result is facilitated.

It will also be noted that it is within the spirit of my invention to employ for the purposes indicated a straight wire 12 in one edge and a coiled wire 13 in the opposite edge of the welt, as shown by Figs. 1 and 2 of the drawings; a straight wire 12 in one edge only; two straight wires, or two coiled wires in opposite edges of the same structure; or, if desired, to employ metallic bead wires 14, 14, shown by Fig. 4, as a substitute for the bead cores 7, 7, or any bendable stiffening means associated with one or both side portions of the welt, adapted to retain the welt in deformed positions when bent either horizontally or vertically. In any event, however, in addition to securing perfectly unbroken and smooth curved edges as aforesaid, these metallic or other bendable elements also assist in securing and binding the finishing welt down in its final operative position, and it will be particularly noted that the pliable stiffening means is equally applicable to all forms of finishing welt having side portions extending outwardly to any appreciable extent, that is to say, to an extent which has in the prior art, made without inclusion of the pliable inserts 12, 13, 12*a* or 13*a*, resulted in puckering or buckling about curves, as above indicated.

Having thus described my present invention, what I now claim and desire to secure by Letters Patent is:

1. In a trimming welt a relatively thick body portion formed wholly of universally flexible material in combination with comparatively thin laterally extending side flanges on said body portion and a metallic insert comprising a continuous coil of wire in one of said flanges.

2. In a trimming welt a relatively thick body portion formed wholly of universally flexible material having a plurality of comparatively thin flanges extending longitudinally along the body portion and a bendable and pliable metallic insert extending longitudinally in one of said flanges, adapted to retain the welt in deformed positions when bent.

3. In a trimming welt a relatively thick body portion formed wholly of universally flexible material in combination with comparatively thin flanges extending laterally from said body portion and bendable inserts positioned longitudinally in each of said flanges, adapted to retain the welt in deformed positions when bent.

4. In a trimming welt the combination with a relatively thick body portion having a longitudinal slot therein for blind nailing, of a comparatively thin laterally extending side flange on said body portion, and a metallic insert extending longitudinally in said flange.

5. In a trimming welt the combination with a relatively thick body portion having a longitudinal slot therein for blind nailing, of a comparatively thin laterally extending side flange on said body portion, and a pliable metallic insert longitudinally positioned in said flange.

6. In a trimming welt the combination with a relatively thick body portion having a longitudinal slot therein for blind nailing, of comparatively thin laterally extending side flanges on said body portion, and a metallic insert comprising a continuous coil of wire in one of said flanges.

7. In a trimming welt the combination with a relatively thick body portion having a longitudinal slot therein for blind nailing, of comparatively thin laterally extending side flanges on said body portion, and a continuous flexible metallic element embedded in one of said flanges.

8. In a trimming welt the combination with a relatively thick body portion having a longitudinal slot therein for blind nailing, of comparatively thin flanges extending laterally from said body portion, and a bendable insert extending longitudinally in one of said flanges, adapted to retain the welt in deformed positions when bent.

9. In a trimming welt the combination with a relatively thick body portion having a longitudinal surface slot therein for blind nailing, of comparatively thin flanges extending laterally from said body portion, and bendable inserts positioned longitudinally in each of said flanges, adapted to retain the welt in deformed positions when bent.

10. In a trimming welt the combination with a relatively thick body portion having a longitudinal slot therein for blind nailing, of a comparatively thin laterally extending side flange on said body portion, and bendable stiffening means associated with said flange adapted to retain the welt in deformed positions when bent.

In testimony whereof I affix my signature.

ROBERT C. SCHEMMEL.